2,977,352
Patented Mar. 28, 1961

2,977,352

PROCESS FOR OBTAINING INFUSIBLE PRODUCTS OF HIGH CARBON CONTENTS FROM LIGNIN SULPHONATES

John L. Gardon, Levittown, Pa., and Bengt Leopold, Hawkesbury, Ontario, Canada, assignors to Canadian International Paper Company, Montreal, Quebec, Canada, a corporation of Canada No Drawing. Filed July 25, 1958, Ser. No. 750,850

5 Claims. (Cl. 260—124)

This invention relates to new and useful improvements in the recovery of ligneous matter from sulphite waste liquors and particularly seeks to provide a novel process for obtaining infusible and partially or completely alkali soluble products of high carbon contents from lignin sulphonates in a solid-solid reaction under alkaline conditions.

In our co-pending patent applications, United States Serial No. 619,430, filed October 31, 1956, now abandoned, and United States Serial No. 699,997, filed December 2, 1957, now Patent No. 2,934,531, we described a novel process for reacting lignin sulphonates and alkaline reagents in the solid state at reaction temperatures between 150 and 350° C. We found there that the demineralized end-products are fusible, highly reactive resins.

We have now discovered that the products obtained at higher reaction temperatures are radically different from the products calcined below 350° C.

Some of these differences can be illustrated by forming the empirical formulas on the basis of phenyl propane ($C_9$) units of the calcined, de-mineralized end-products:

| Calcining temperature, °C. | Formula |
|---|---|
| 280 | $C_9H_{6.00}O_{1.69}(CH_3O)_{0.71}(OH)_{0.82}S_{0.14}$ |
| 350 | $C_9H_{6.44}O_{1.60}(CH_3O)_{0.15}(OH)_{0.87}S_{0.13}$ |
| 400 | $C_9H_{5.16}O_{0.74}(CH_3O)_{0.01}(OH)_{0.75}S_{0.11}$ |
| 450 | $C_9H_{6.05}O_{0.48}(CH_3O)_{0.00}(OH)_{0.56}S_{0.07}$ |

By substituting hydrogen for methoxyl, hydroxyl and sulfur, formulas of the "skeleton" can be obtained:

| Calcining temperature, °C. | Formula |
|---|---|
| 280 | $C_9H_{7.67}O_{1.69}$ |
| 350 | $C_9H_{7.64}O_{1.60}$ |
| 400 | $C_9H_{6.03}O_{0.74}$ |
| 450 | $C_9H_{6.69}O_{0.48}$ |

As can be seen, the composition of the "skeleton" is practically identical for products calcined at 280 and 350° C. The products calcined at 400 and 450° C. contain less hydrogen and oxygen per carbon in the "skeleton" than lignins calcined at lower temperatures. It can be concluded that above 350° C. new carbon-carbon bonds are formed resulting in strongly fused structures.

Besides the analytical data, X-ray powder diagrams also demonstrate the striking difference between products calcined below and above 350° C. Products calcined below 350° C. are amorphous and products calcined above 350° C. are microcrystalline. The size of the crystallites is in the range of 20 Å.

The simultaneous formation of crystallites and of condensed structures with increased carbon contents can be explained by partial graphitization at calcining temperatures above 350° C.

The change in the basic structure of the lignin molecules, described above, is a main feature of our invention and is the cause of the infusibility and inertness of the products calcined above 350° C.

As described in the above-mentioned co-pending patent applications, an important feature of the alkaline calcination process is the removal of sulphonic acid groups from the lignin molecule in the transformation of lignin sulphonates into products which are insoluble in neutral to acid and soluble in alkaline aqueous solutions.

The effect of the calcination treatment is not confined to the sulphur containing groups, but the changes in methoxyl, hydroxyl, carbonyl contents and in reducing power of the products follow different patterns below and above 350° C.

Below 320° C., methoxyl groups are removed and replaced by hydroxyl groups. The methoxyl contents of products calcined e.g. at 240° C. and 320° C. are 5.1 and 1.0 milliequivalent/gram respectively. The sum of methoxyl and hydroxyl groups is, however, constant, being on the average 8.8 milliequivalent/gram.

Above 320° C., the sum of hydroxyl and methoxyl groups per gram begins to decrease with increasing calcining temperature, probably by dehydration and reduction. At about 350° C., a sudden drop in the sum of hydroxyl and methoxyl groups occurs, down to a value of about 5.5 milliequivalents/gram.

A striking difference occurs with respect to the reducing group contents as the calcining temperature is raised above 350° C. Up to 350° C., the reducing group content increases with the calcining temperature but above 350° C., it decreases with increasing calcining temperature. For example between 240 and 350° C. the reducing group content, measured by the reduction of Fehling's solution as equivalent glucose, increases from 1 to 4.67 milliequivalents/gram; above 350° C. it decreases and reaches the value of 0.41 at 450° C.

The increase in reducing groups is probably partly due to the formation of o-diphenolic groupings and partly to the formation of carbonyl groups.

The decrease in reducing group content above 350° C. is probably closely linked to the formation of condensed structures. As the lignin skeleton collapses at elevated temperatures, the more labile aliphatic parts of the molecules are affected first. The carbonyl groups are attached to the aliphatic chains, and are progressively removed with them.

In the discussion above we have presented the available evidence concerning the changes in chemical and supermolecular structure of the lignin sulponates when processed according to our invention. The most important effect of these changes, as already pointed out, is the infusibility of the material calcined above 350° C. The thermal stability of the product calcined at 400° C. is demonstrated, for example, by surface area determinations by nitrogen adsorption. Before the determinations the sample was degassed at 25, 100 and 200° C. The determined specific surface area was independent of the degassing temperature and had a value of 1.22 sq. m./g.

Another very important property of the high temperature calcined lignin sulponates is the solubility behavior. In spite of their microcrystalline structure and their high carbon contents (ranging from 65 to 75%) the products calcined between 350 and 400° C. are completely soluble in alkaline aqueous solutions.

It is also of great interest that as the calcining temperature is raised, the "critical pH value" where the material precipitates from solution on neutralization varies with the calcining temperature. For example products calcined at 240, 280, 320, 350 and 400° C. have "critical pH values" of 0.8, 2, 2.5, 3.4 and 7 respectively. The variability between 3.4 and 7 pH units is of especially great practical importance when the products are used as fillers in wet compounding of rubber. By varying the calcining temperature, it is possible to tailor make a product in such a manner that it precipitates at exactly the same pH as that required to coagulate a given latex emulsion, resulting in a more intimate mixing of filler and rubber. This intimate mixing is enhanced by the extreme fineness of the precipitates formed at the "critical pH."

When the calcining temperature is raised above 400° C., the end-product gradually loses its solubility in caustic.

We have discussed above the properties of the products obtained when a mixture of lignin sulphonates and an excess of alkaline reagent, such as lime, is calcined at temperatures above 350° C. and is subsequently demineralized with an acid.

Accordingly, an object of this invention is to provide a novel process to modify lignin sulphonates in such manner that the sulphonic acid groups are removed, the structure of the lignin becomes condensed and the material becomes generally infusible, while remaining at least partially alkali soluble. A solid-solid reaction under alkaline conditions serves as a basis of this process.

A further object of this invention is to provide a process of the character stated which includes the step of heating a reaction mixture consisting of a lignin sulphonate salt and an alkaline reagent in the dry state to about 350 to 550° C. at atmospheric pressure.

A further object of this invention is to provide a process of the character stated which includes the steps of precipitating basic lignin sulphonate from waste sulphite liquor with an excess of lime, drying the precipitated basic lignin sulphonate, and then heating it at atmospheric pressure to about 350 to 550° C.

A further object of this invention is to provide a process of the character stated in which the calcined product is de-ashed with an aqueous mineral acid.

A further object of this invention is to provide a process of the character stated in which the alkaline reagent is selected from the group consisting of the oxides, hydroxides and carbonates of alkaline earth metals.

The starting materials for this dry state desulphonation consist of a dry lignin sulphonate preparation and a solid basic reagent. Suitable reaction mixtures can be prepared by either (1) filtering off the product obtained by the precipitation of basic lignin sulphonates from sulphite waste liquor with an excess of solid lime under atmospheric pressure, or (2) mixing an excess of lime with the sulphite waste liquor and/or sulphite waste liquor concentrate and drying this mixture, or (3) mixing dried sulphite waste liquor solids with lime in the dry state, wetting the mixture uniformly to yield a paste and drying the same, or (4) mixing thoroughly any kind of neutral or alkaline lignin sulphonate salt preparation with any kind of solid alkaline reagent, e.g. sodium hydroxide, potassium hydroxide, magnesium hydroxide, or magnesium oxide, to yield a dry reaction mixture, in a manner familiar to those versed in the art.

We prefer to carry out the drying and the subsequent heat treatment of any of the aforementioned reaction mixtures in one stage, but these operations can also be carried out separately. We also prefer the use of a continuous rotary oven or kiln for this purpose, but any other kind of equipment can also be used in which the reaction mixture can be heated to the desired temperature.

After the calcination is completed, the ligneous matter in the reaction mixture may be freed from minerals (de-ashed) in aqueous suspension. For de-ashing we prefer to apply sulphurous acid and subsequently use the filtrate containing the lime as calcium bisulphite in the cooking acid for the acid pulping of wood, but other acids, such as hydrochloric acid, may also be used for de-ashing. After de-ashing, the ligneous end-product is filtered and washed.

The properties of three typical products are presented in Table I. As comparison, data of a sample calcined at a lower temperature are also included into this table.

TABLE I

*Properties of calcined and de-ashed lignin samples*

| | | 280 | 350 | 400 | 450 |
|---|---|---|---|---|---|
| Calcining temperature | ° C | 280 | 350 | 400 | 450 |
| Moisture | percent | 7.54 | 6.43 | 9.15 | 16.05 |
| Ash | do | 3.46 | 1.15 | 1.00 | 0.20 |
| Methoxyl | m. eq./g | 3.75 | 0.88 | 0.10 | 0.00 |
| Hydroxyl | m. eq./g | 4.4 | 5.2 | 5.2 | 4.2 |
| Sulphur | m. eq./g | 0.75 | 1.10 | 0.83 | 0.46 |
| Reducing groups | m. eq./g | 2.30 | 4.07 | 3.99 | 0.41 |
| Carbon (moisture and ash free basis) | percent | 64.1 | 66.5 | 76.2 | 81.0 |
| Hydrogen | do | 4.75 | 4.80 | 4.16 | 4.95 |
| Oxygen | do | 28.5 | 25.1 | 16.9 | 12.5 |
| Alkali solubility | do | 100 | 100 | 100 | 40 |

*Example*

25 kg. of calcium oxide was stirred at 65° C. into 1000 liters of sulphite waste liquor containing 150 kg. of solids. The resulting precipitate was filtered, dried and calcined at 400° C. for one hour. After calcination, the reaction mixture was cooled. It was then suspended in 2000 liters of water and 47 kg. of sulphur dioxide was stirred into this suspension. The insoluble product was filtered, washed with water, and dried at 80° C. The resulting end-product, when bone dry, weighed 50 kg.

We claim:

1. The process of obtaining infusible microcrystalline products of high carbon content which are at least partially soluble in alkaline aqueous solutions, which includes the steps of precipitating basic lignin sulphonate from waste sulphite liquor material by reacting said material with an excess of a solid alkaline reagent selected from the group consisting of the oxides, hydroxides and carbonates of the alkali and alkaline earth metals, and then calcining the basic lignin sulphonate at a temperature above 350° C.

2. In the process as set forth in claim 1 the additional steps of de-ashing the calcined product by treating it with an aqueous mineral acid and then filtering it.

3. The process as set forth in claim 1 in which the solid alkaline reagent is lime.

4. An at least partially alkali soluble, infusible, microcrystalline material containing 65 to 85% carbon and which is produced by calcining above 350° C. the reaction product of waste sulphite liquor material and an excess of a solid alkaline reagent selected from the group consisting of the oxides, hydroxides and carbonates of the alkali and alkaline earth metals.

5. An at least partially alkali soluble, infusible, microcrystalline material containing 65 to 85% carbon and which is produced by calcining above 350° C. and de-ashing with an aqueous mineral acid the reaction product of waste sulphite liquor material and an excess of a solid alkaline reagent selected from the group consisting of the oxides, hydroxides and carbonates of the alkali and alkaline earth metals.

References Cited in the file of this patent

UNITED STATES PATENTS 2,683,706    Muller _____ July 13, 1954

FOREIGN PATENTS 170,634    Austria _____ Mar. 10, 1952